United States Patent
Kim et al.

(10) Patent No.: US 10,469,294 B2
(45) Date of Patent: Nov. 5, 2019

(54) METHOD FOR RECEIVING DOWNLINK BY UE IN WIRELESS COMMUNICATION SYSTEM AND DEVICE THEREFOR

(71) Applicant: Samsung Electronics Co., Ltd., Gyeonggi-do (KR)

(72) Inventors: Donghan Kim, Gyeonggi-do (KR); Youngbum Kim, Seoul (KR); Seunghoon Choi, Gyeonggi-do (KR); Sangmin Ro, Seoul (KR); Jinyoung Oh, Seoul (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/743,946

(22) PCT Filed: Jul. 8, 2016

(86) PCT No.: PCT/KR2016/007434
§ 371 (c)(1),
(2) Date: Jan. 11, 2018

(87) PCT Pub. No.: WO2017/010751
PCT Pub. Date: Jan. 19, 2017

(65) Prior Publication Data
US 2018/0205581 A1 Jul. 19, 2018

(30) Foreign Application Priority Data
Jul. 16, 2015 (KR) .................. 10-2015-0100925

(51) Int. Cl.
*H04L 25/06* (2006.01)
*H04W 4/70* (2018.01)
(Continued)

(52) U.S. Cl.
CPC ........ *H04L 25/061* (2013.01); *H04J 11/0066* (2013.01); *H04J 11/0079* (2013.01);
(Continued)

(58) Field of Classification Search
None
See application file for complete search history.

(56) References Cited

U.S. PATENT DOCUMENTS

| 2012/0281774 A1* | 11/2012 | Lee | H04B 7/0452 375/260 |
| 2013/0010743 A1* | 1/2013 | Ahn | H04L 1/1621 370/329 |

(Continued)

FOREIGN PATENT DOCUMENTS

EP    2704348    3/2014

OTHER PUBLICATIONS

PCT/ISA/210 Search Report issued on PCT/KR2016/007434 (pp. 4).

(Continued)

*Primary Examiner* — Otis L Thompson, Jr.
(74) *Attorney, Agent, or Firm* — The Farrell Law Firm, P.C.

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

There may be provided a method for receiving a downlink by a UE that uses narrowband communication and a UE for performing the same, the method comprising the steps of: setting one subcarrier, among narrowband frequency resources assigned to the UE, as a narrowband direct current (DC) subcarrier; receiving a signal regarding the narrow- (Continued)

band frequency resources from an eNB; and decoding the received signal on the basis of the narrowband DC subcarrier that has been set.

15 Claims, 12 Drawing Sheets

(51) Int. Cl.
| | |
|---|---|
| *H04J 11/00* | (2006.01) |
| *H04L 27/26* | (2006.01) |
| *H04L 5/00* | (2006.01) |
| *H04B 1/30* | (2006.01) |
| *H04L 27/20* | (2006.01) |
| *H04L 27/38* | (2006.01) |

(52) U.S. Cl.
CPC ............ *H04L 5/005* (2013.01); *H04L 5/0064* (2013.01); *H04L 27/2602* (2013.01); *H04L 27/265* (2013.01); *H04L 27/2613* (2013.01); *H04W 4/70* (2018.02); *H04B 2001/305* (2013.01); *H04J 2211/005* (2013.01); *H04L 5/0023* (2013.01); *H04L 5/0035* (2013.01); *H04L 27/2089* (2013.01); *H04L 27/3863* (2013.01)

(56) References Cited

U.S. PATENT DOCUMENTS

| | | | |
|---|---|---|---|
| 2013/0051500 A1* | 2/2013 | Mo | H04L 27/38 375/340 |
| 2013/0114587 A1* | 5/2013 | Khoryaev | H04L 5/0094 370/343 |
| 2014/0064067 A1 | 3/2014 | Drewes et al. | |
| 2014/0198663 A1 | 7/2014 | Xu et al. | |
| 2014/0357272 A1 | 12/2014 | Axmon et al. | |
| 2015/0146640 A1 | 5/2015 | Baldemair et al. | |
| 2015/0181603 A1 | 6/2015 | Wakabayashi | |
| 2016/0072614 A1* | 3/2016 | Blankenship | H04W 4/70 370/329 |
| 2016/0105803 A1* | 4/2016 | Sakhnini | H04L 27/265 455/45 |
| 2016/0295345 A1* | 10/2016 | Oh | H04W 4/70 |
| 2016/0302092 A1* | 10/2016 | Sartori | H04W 52/0209 |
| 2017/0064685 A1* | 3/2017 | Rico Alvarino | H04B 7/0456 |
| 2017/0164364 A1* | 6/2017 | Song | H04W 4/70 |
| 2017/0290016 A1* | 10/2017 | Yi | H04W 72/042 |
| 2018/0184390 A1* | 6/2018 | Wu | H04L 27/2613 |
| 2018/0270031 A1* | 9/2018 | Xia | H04W 16/14 |

OTHER PUBLICATIONS

PCT/ISA/237 Written Opinion issued on PCT/KR2016/007434 (pp. 5).
3GPP TSG RAN WG1 Meeting #81, Fukuoka, Japan, May 25-29, 2015, MediaTek Inc., MTC narrow-band discussion and resource allocation design, pp. 5.

* cited by examiner

METHOD FOR RECEIVING DOWNLINK BY UE IN WIRELESS COMMUNICATION SYSTEM AND DEVICE THEREFOR

PRIORITY

This application is a National Phase Entry of PCT International Application No. PCT/KR2016/007434 which was filed on Jul. 8, 2016, and claims priority to Korean Patent Application No. 10-2015-0100925, which was filed on Jul. 16, 2015, the content of each of which is incorporated herein by reference.

TECHNICAL FIELD

The present invention relates to a downlink signal reception method and apparatus of a terminal in a wireless communication system. In particular, the present invention relates to a downlink signal reception method and apparatus of a low-cost machine-type terminal in a wireless communication system.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system. Consideration is being given to implementing the 5G communication system in millimeter wave (mmWave) frequency bands (e.g., 60 GHz bands) to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna. Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation. Furthermore, the ongoing research includes the use of hybrid frequency shift keying (FSK) and quadrature amplitude modulation (QAM){FQAM} and sliding window superposition coding (SWSC) as advanced coding modulation (ACM), filter bank multi-carrier (FBMC), non-orthogonal multiple access (NOMA), and sparse code multiple access (SCMA).

Meanwhile, the Internet is evolving from a human-centric communication network in which information is generated and consumed by humans to the Internet of things (IoT) in which distributed things or components exchange and process information. The combination of the cloud server-based Big data processing technology and the IoT begets Internet of everything (IoE) technology. In order to secure the sensing technology, wired/wireless communication and network infrastructure, service interface technology, and security technology required for implementing the IoT, recent research has focused on sensor network, machine-to-machine (M2M) communication, and machine-type communication (MTC) technologies. In the IoT environment, it is possible to provide an intelligent Internet Technology that is capable of collecting and analyzing data generated from connected things to create new values for human life. The IoT can be applied to various fields such as smart home, smart building, smart city, smart car or connected car, smart grid, health care, smart appliance, and smart medical service through legacy information technology (IT) and convergence of various industries.

Thus, there are various attempts to apply the IoT to the 5G communication system. For example, the sensor network, M2M communication, and MTC technologies are implemented by means of the 5G communication technologies such as beamforming, MIMO, and array antenna. The application of the aforementioned cloud RAN as a big data processing technology is an example of convergence between the 5G and IoT technologies.

The mobile communication system has evolved to broadband wireless communication systems for supporting high-speed, high-quality wireless packet data services beyond the early voice-oriented services on the basis of communication standards such as high-speed packet access (HSPA) of the 3rd generation partnership project (3GPP), long term evolution (LTE) or evolved universal terrestrial radio access (E-UTRA), high rate packet data (HRPD) of the 3GPP2, ultra-mobile broadband (UMB), and 802.16e of the Institute of Electrical and Electronics Engineers (IEEE).

The LTE system as one of the representative broadband wireless communication systems uses orthogonal frequency division multiple access (OFDMA) in the downlink and single carrier frequency division multiple access (SC-FDMA) in the uplink. Such a multiple access scheme is characterized by allocating the time-frequency resources for transmitting user-specific data and control information without overlap of each other, i.e. maintaining orthogonality, so as to distinguish among user-specific data and control information.

The LTE system adopts a Hybrid Automatic Repeat Request (HARQ) scheme for physical layer retransmission when decoding failure occurs in initial data transmission. The HARQ scheme is designed to operate in such a way that a receiver that fails in decoding data sends a transmitter a negative acknowledgement (NACK) indicative of decoding failure in order for the transmitter to retransmit the corresponding data on the physical layer. The receiver combines the retransmitted data with the decoding-failed data to improve data reception performance. It may also be possible for the receiver to send the transmitter an Acknowledgement (ACK) indicative of successful decoding, when the data are decoded successfully, in order for the transmitter to transmit new data.

The LTE system also adopts a channel state-adaptive resource allocation scheme to improve downlink reception performance of a terminal. The base station transmits channel state information-reference signal (CSI-RS) in downlink for the purpose of channel-adaptive resource allocation to the terminal That is, the terminal performs channel measurement on the CSI-RS to generate channel quality information (CQI) and transmits the CQI to the base station. The base station may allocate best frequency resources to the terminal based on the CQI.

DISCLOSURE OF INVENTION

Technical Problem

The present invention aims to provide a downlink signal reception method and apparatus of a terminal in a wireless communication system. Also, the present invention aims to provide a downlink reception method and apparatus of a low-cost machine-type terminal in a wireless communication system.

Solution to Problem

In accordance with an aspect of the present invention, a downlink signal reception method of a narrowband communication terminal includes configuring one of subcarriers forming a narrowband frequency region allocated to the terminal as a narrowband direct current (DC) subcarrier, receiving a signal from a base station in the narrowband frequency region, and decoding the received signal based on the configured narrowband DC subcarrier In accordance with another aspect of the present invention, a narrowband communication terminal for receiving a downlink signal includes a transceiver for transmitting and receiving signals and a controller which configures one of subcarriers forming a narrowband frequency region allocated to the terminal as a narrowband direct current (DC) subcarrier and controls the transceiver to receive a signal from a base station in the narrowband frequency region, and controls decoding the received signal based on the configured narrowband DC subcarrier.

The objects of the present invention are not limited to the aforesaid, and other objects not described herein will be clearly understood by those skilled in the art from the descriptions below.

Advantageous Effects of Invention

The downlink signal reception method and apparatus of the present invention is advantageous in terms of facilitating downlink signal reception of a terminal in a wireless communication system. Also, the downlink signal reception method and apparatus of the present invention is advantageous in terms of being used for an MTC terminal. Also, the downlink signal reception method and apparatus of the present invention is advantageous in terms of minimizing the impact of a direct current (DC) offset caused by the incomplete radio frequency (RF) characteristic of a low-cost low complexity MTC terminal that operates in a narrow downlink band regardless of system transmission bandwidth of the base station.

Also, the downlink signal reception method and apparatus of the present invention is advantageous in terms of protecting against a terminal's reception performance degradation caused by channel estimation and equalization failure occurring because the low-cost MTC terminal is configured to minimize the impact of DC offset in receiving a downlink signal in a narrowband and to avoid receiving a downlink signal on a subcarrier conveying a reference signal in the narrowband.

MODE FOR THE INVENTION

Figure 1:
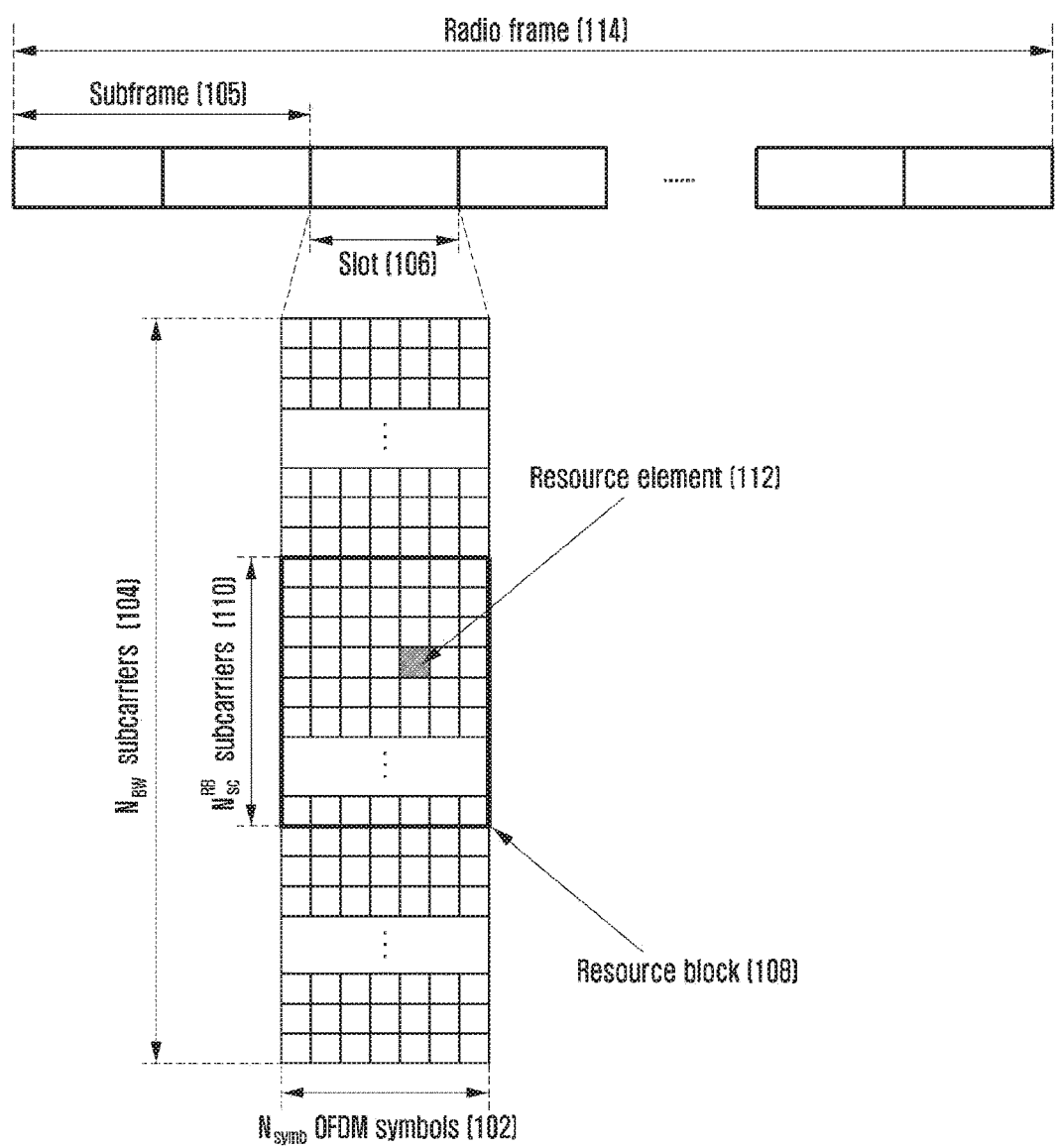
FIG. 1 is a diagram illustrating a time-frequency resource structure for transmitting downlink data and control channels in an LTE system.

Exemplary embodiments of the present invention are described in detail with reference to the accompanying drawings. Detailed descriptions of well-known functions and structures incorporated herein may be omitted to avoid obscuring the subject matter of the present invention. Further, the following terms are defined in consideration of the functionality in the present invention, and they may vary according to the intention of a user or an operator, usage, etc. Therefore, the definition should be made on the basis of the overall content of the present specification.

A main entity that is responsible for resource allocation to terminals may be a Node B, an evolved Node B (eNB), a base station (BS), a radio access unit, a base station controller, or any network node. An entity being served by the main entity may be a terminal, a user equipment (UE), a mobile station (MS), a cellular phone, a smartphone, a computer, or a communication function-equipped multimedia system. In the present invention, the term "Downlink (DL)" denotes a radio transmission path from an eNB to a UE, and the term "Uplink (UL)" denotes a radio transmission path from the UE to the eNB. Although the following description is directed to Long-Term Evolution (LTE) and LTE-Advanced (LTE-A), it will be understood by those skilled in the art that the present invention can be applied to other communication systems having a similar technical background and channel format, with a slight modification, without departing from the spirit and scope of the present invention.

The present invention provides a signal reception method and apparatus of a low-cost MTC UE limited to narrowband communication with an eNB for low cost and low complexity operation in an LTE/LTE-A system. The low cost MTC UE is configured with an RF module and a baseband module that always operate in a narrowband regardless of the system transmission bandwidth of the LTE system to reduce the cost and complexity of the UE. Such a narrowband communication terminal performs frequency hopping among available narrowband regions within the system transmission bandwidth as configured by the eNB or according to a predetermined rule or pattern.

In the legacy LTE/LTE-A system, the eNB does not use the DC subcarrier for downlink transmission to minimize the impact of DC offset at the UE in receiving a downlink signal and to reduce the complexity of the UE. However, the subcarrier corresponding to the DC subcarrier in a narrow bandwidth for the low-cost MTC UE should be used for transmitting data and reference signals. Accordingly, the low-cost MTC UE has to avoid using the DC subcarrier placed in a narrowband to minimize the impact of the DC offset, especially when the DC offset is significant. The present invention proposes a signal reception method and apparatus of a narrowband MTC UE that is capable of receiving downlink signals while minimizing the impact of the DC offset.

Also, the present invention provides a method for selecting the DC subcarrier to minimize reception performance degradation caused by the DC offset at the low-cost MTC UE in an environment where there is a plurality of narrow bands with a bandwidth available for use in receiving a downlink signal within the system transmission bandwidth and a method and apparatus for receiving control information and data on the DC subcarrier.

In the case of transmitting data and reference signals on the DC subcarrier within a narrowband bandwidth, if the UE does not use the DC subcarrier because of the impact of the DC offset, this may cause a problem in that the terminal cannot perform reference signal-based multipath delay channel state estimation. In order to overcome this problem, the present invention provides a method and apparatus for minimizing the influence on the data and reference signals in receiving a narrowband downlink signal.

Also, the present invention provides a method and apparatus of shifting the center frequency of the low-cost MTC UE to make it possible for the low-cost MTC UE to select the DC subcarrier in such a way of minimizing performance degradation caused by the DC offset.

FIG. 1 is a diagram illustrating a time-frequency resource structure for transmitting downlink data and control channels in an LTE system.

In FIG. 1, the horizontal axis is time domain, and the vertical axis is frequency domain. The minimum unit on the time axis is an OFDM symbol, and $N_{symb}$ OFDM symbols 102 forms a slot 106, and 2 slots form a subframe 105. Each slot spans 0.5 ms, and each subframe spans 1.0 ms. A radio frame 114 is a time unit consisted of 10 subframes. In the frequency domain, the smallest transmission unit is a subcarrier, and the total system transmission bandwidth consists of $N_{BW}$ (104) subcarriers.

In the time-frequency resource structure, the basic resource unit is a resource element (RE) 112 indicated by an OFDM symbol index and a subcarrier index. A resource block (RB) (or Physical Resource Block (PRB)) 108 is defined by $N_{symb}$ consecutive OFDM symbols 102 in the time domain and $N_{sc}^{RB}$ consecutive subcarriers 110 in the frequency domain. That is, one RB 108 consists of $N_{symb} \times N_{sc}^{RB}$ Res 112. Typically, the RB is the smallest data transmission unit. Typically, in the LTE system, $N_{symb}=7$, $N_{sc}^{RB}=12$, and $N_{BW}$ and $N_{RB}$ are proportional to the system transmission bandwidth. That is, the number of RBs available in the system transmission bandwidth becomes $N_{RB}^{DL}$, and $N_{BW}=N_{RB}^{DL}sN_{sc}^{RB}$.

The data rate increases in proportion to the number of RBs scheduled to the terminal. For the LTE system, 6 transmission bandwidths are defined. In the case of an FDD system in which downlink and uplink are separated in frequency, the downlink transmission bandwidth and uplink transmission bandwidth may differ from each other. The channel bandwidth denotes an RF bandwidth in comparison with the system transmission bandwidth. Table 1 shows the relationship between the system transmission bandwidth and channel bandwidth defined in the LTE standard. For example, an LTE system having 10 MHz channel bandwidth uses the transmission bandwidth of 50 RBs.

TABLE 1

| | Channel bandwidth $BW_{channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

LTE supports quadrature phase shift keying (QPSK), 16-quadrature amplitude modulation (16QAM), and 64QAM of which the modulation orders are 2, 4, and 6, respectively. QPSK carries 2 bits, 16QAM carries 4 bits, and 64QAM carries 6 bits of user data per symbol.

An LTE system may be configured to support a low-cost low-complexity UE by limiting some UE functions. A low-cost UE is likely to be suitable for MTC and M2M services in the fields of remote meter reading, crime prevention, and distribution. The low-cost MTC UE is expected to become a promising means for realizing cellular-based IoT.

In order to meet the low-cost/low-complexity requirements for a low-cost MTC UE, consideration may be given to reducing the RF device cost by decreasing the number of receive antennas of the UE to 1 or to reducing the data reception buffer cost by setting an upper limit of the transport block size (TBS) capable of being processed by the MTC UE. Unlike the LTE UE that has a wideband signal transmission/reception function at least in 20 MHz bandwidth regardless of the system transmission bandwidth, the low-cost MTC is configured to have a maximum bandwidth less than 20 MHz to contribute to the realization of low-cost/low-complexity. For example, it may be possible to define the operation of a low-cost MTC UE operating in a maximum channel bandwidth of 1.4 MHz in the LTE system with the channel bandwidth of 20 MHz.

In order to meet the low-cost/low-complexity requirements, the low-cost MTC UE operating at a bandwidth (e.g., 1.4 MHz bandwidth) narrower than the system transmission bandwidth may communicate with the eNB through one of a plurality of narrow bands available within the system transmission bandwidth. A narrowband region available for the low-cost MTC UE consists of 6 consecutive RBs, and a plurality of narrowband regions are defined within the system transmission bandwidth without being overlapped with each other. The low-cost MTC UE may transmit/receive a signal in a narrowband region configured by the eNB or on a certain narrowband channel at a certain time according to a predetermined narrowband frequency hopping pattern within the system transmission bandwidth.

In the legacy LTE system, no signal is mapped to the subcarrier of the downlink system transmission bandwidth. This subcarrier is typically referred to as direct current subcarrier (DC subcarrier) and, in the present invention, as system DC subcarrier. Typically, the DC subcarrier is more susceptible than other subcarriers to noise within the system transmission bandwidth because of the imperfect characteristic of the RF section of the UE (e.g., direct current (DC) offset and local oscillator leakage (LO leakage)). Accordingly, if data transmission is performed on the system DC subcarrier of the system, the data error probability is likely to increase in comparison with the case of data transmission on a non-DC subcarrier. For this reason, the eNB transmits no data in the system DC subcarrier at the center of the system transmission bandwidth to minimize the impact of the DC offset and LO leakage in receiving downlink signals at the UE and simplifying implementation of the UE.

In the legacy LTE/LTE-A system, the system transmission bandwidth for downlink transmission of the eNB is identical with the system transmission bandwidth assumed by the UE for downlink reception. Accordingly, the UE has to configure the downlink reception bandwidth of the RF and baseband sections of the UE to be identical with the downlink transmission bandwidth of the RF and baseband section of the eNB. For this reason, the system DC subcarrier within the downlink system transmission bandwidth is at both the UE and eNB.

The transmission bandwidth of the narrowband region for the low-cost MTC UE to receive a downlink signal differs from the system transmission bandwidth for the eNB to transmit the downlink signal. For example, the eNB has the system transmission bandwidth of 20 MHz for downlink transmission while the UE always has the narrowband reception bandwidth of 1.4 MHz regardless of the system transmission bandwidth. Since the DC offset gives more significant impact to the receiver of the UE than to the transmitter of the eNB, the data reception performance degradation and data error probability increase in the subcarrier corresponding to the DC subcarrier in every narrowband region available for use by the low-cost MTC UE.

In an embodiment of the present invention, a DC subcarrier being considered in every narrowband region is referred to as narrowband DC subcarrier. However, because the narrowband region available for use by the low-cost MTC UE complies with the definition of resource blocks for use by the legacy UE, it is difficult to allocate any subcarrier carrying neither data nor reference signal, such as system DC subcarrier, within the resource blocks forming the narrowband region. In this respect, the present invention proposes a method and apparatus that is capable of minimizing the impact of the DC offset at the low-cost MTC UE while allowing the eNB to transmit downlink signals without consideration of the DC subcarrier of narrowband regions.

Figure 2:
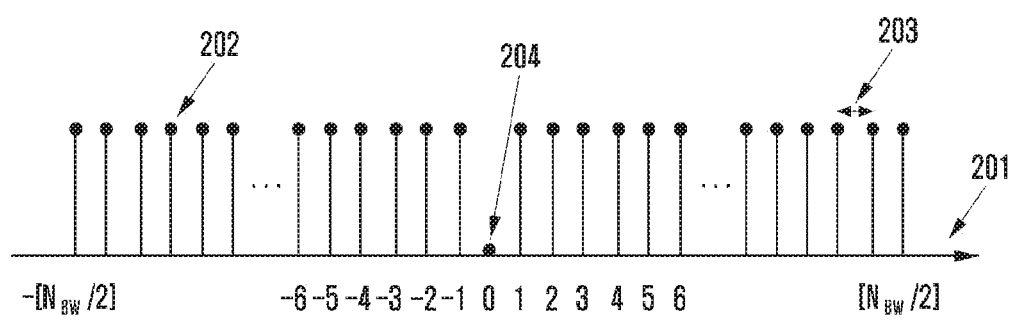
FIG. 2 is a diagram for explaining an OFDMA subcarrier mapping for data and control channel or signal transmission within a downlink system transmission bandwidth for generating a downlink OFDMA signal in a legacy LTE/LTE-A system.

FIG. 2 is a diagram for explaining an OFDMA subcarrier mapping for data and control channels or signal transmission within a downlink system transmission bandwidth for generating a downlink OFDMA signal in a legacy LTE/LTE-A system.

In FIG. 2, a plurality of subcarriers are arranged at an OFDM subcarrier interval Δf 203 on the frequency axis 201 for generating a downlink OFDM symbol. The subcarriers within the system transmission bandwidth include non-DC subcarriers 202 for transmitting data, control information, and reference signals and a system DC subcarrier 204 carrying no signal. As shown in FIG. 2, the system DC subcarrier 204 is located at the center of the system transmission bandwidth. As described above, the system DC subcarrier 204 is not used to transmit any signal to avoid performance degradation caused by the DC offset. The number of non-DC subcarriers 202 for use in transmitting data, control information, and reference signals is $N_{BW} = N_{RB}^{DL} s N_{sc}^{RB}$, and the system DC subcarrier is the middle subcarrier of $N_{BW}$ subcarriers.

Equation (1) is a method for generating a downlink OFDMA time domain signal of the LTE/LTE-A system according to the subcarrier mapping depicted in FIG. 2.

$$s_l^{(p)}(t) = \sum_{k=-\lfloor N_{RB}^{DL} N_{sc}^{RB}/2 \rfloor}^{-1} a_{k(-),l}^{(p)} \cdot e^{j2\pi k \Delta f (t - N_{CP,l} T_s)} + \sum_{k=1}^{\lfloor N_{RB}^{DL} N_{sc}^{RB}/2 \rfloor} a_{k(+),l}^{(p)} \cdot e^{j2\pi k \Delta f (t - N_{CP,l} T_s)}$$

Equation (1)

In the time domain, the downlink time domain OFDMA signal corresponding to antenna port p and OFDM symbol l may be generated by equation (1). Here, $0 \le t < (N_{CP,l} + N) \times T_s$, $k^{(-)} = k + \lfloor N_{RB}^{DL} N_{sc}^{RB}/2 \rfloor$, and $k^{(+)} = k + \lfloor N_{RB}^{DL} N_{sc}^{RB}/2 \rfloor - 1$; $a_{k,l}^{(p)}$ denotes a QPSK or QAM symbol corresponding to the data, control information, or reference signal transmitted through antenna port p on subcarrier k at OFDM symbol l; $N_{CP,l}$ denotes a number of samples of the cyclic prefix of OFDM symbol l; and $T_s$ denotes an OFDM symbol period.

In reference to equation (1) for generating the downlink OFDMA time domain signal, it is possible to check that $a_{k,l}^{(p)}$ corresponding to k=0 denotes the system DC subcarrier, which is not used for data transmission as shown in FIG. 2.

Figure 3:
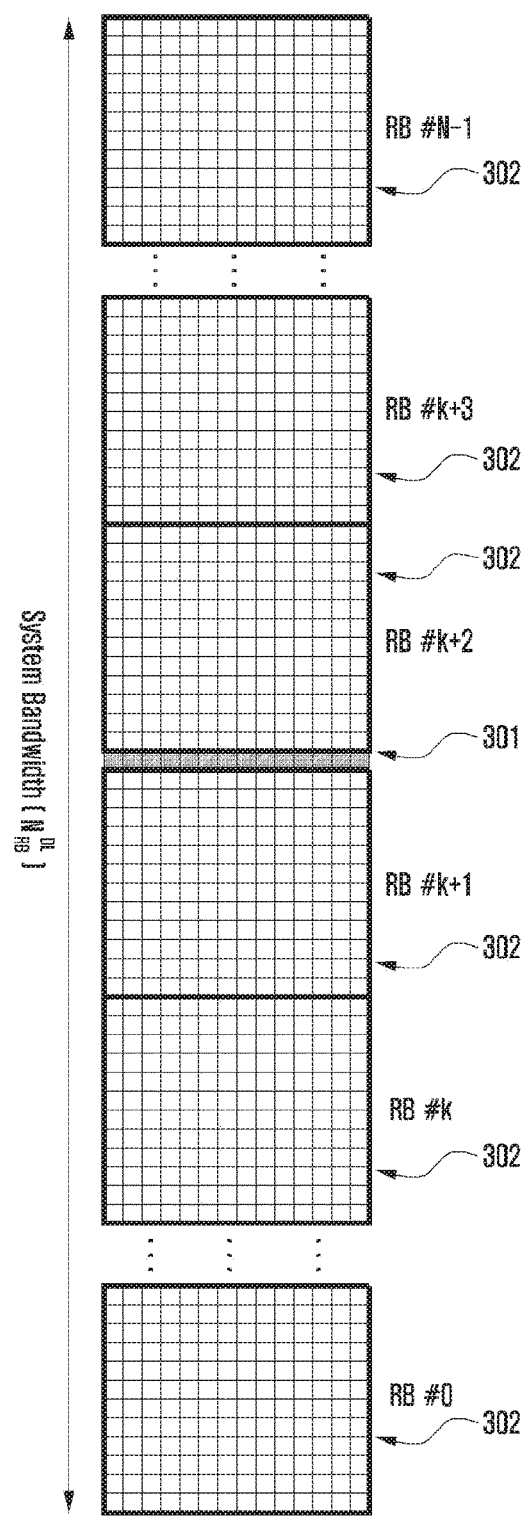
FIG. 3 is a diagram illustrating a system DC subcarrier in association with resource blocks within a system transmission bandwidth in an LTE/LTE-A system operating with the downlink system transmission bandwidth of 1.4 MHz, 10 MHz, or 20 MHz.

FIG. 3 is a diagram illustrating a system DC carrier in association with resource blocks within a system transmission bandwidth in an LTE/LTE-A system operating with the downlink system transmission bandwidth of 1.4 MHz, 10 MHz, or 20 MHz.

As shown in FIG. 3, the number of resource blocks 302 is even in the system operating with the system transmission bandwidth of 1.4 MHz, 10 MHz, or 20 MHz. That is, $N_{RB}^{DL}$ is an even number. Accordingly, $N_{RB}^{DL}/2$ resource blocks are located at each of both sides of the system DC subcarrier 301, which is located at the center of the system transmission bandwidth. Also, the system DC subcarrier 301 is not included in any resource block 302 within the system transmission bandwidth. Since the eNB uses a resource block as the basic unit for downlink data transmission to the normal UEs and low-cost MTC UEs, the data, control information, and reference signal are always transmitted to the UE regardless of the system DC subcarrier.

Figure 4:
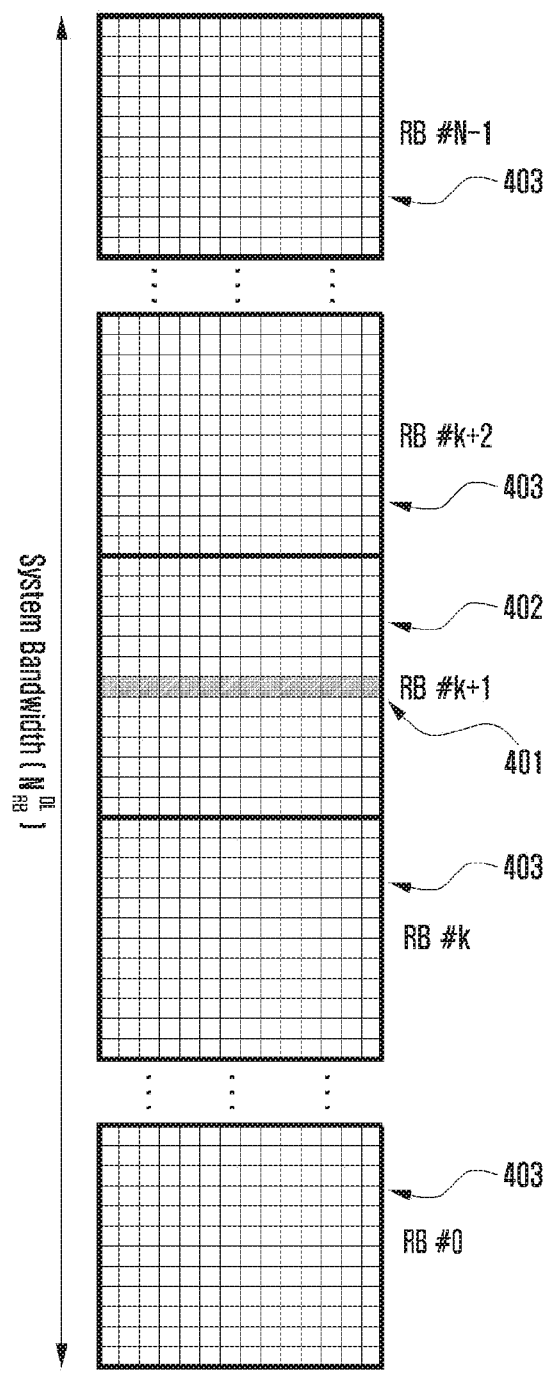
FIG. 4 is a diagram illustrating a system DC subcarrier in association with resource blocks within a system transmission bandwidth in an LTE/LTE-A system operating with the downlink system transmission bandwidth of 3 MHz, 5 MHz, or 15 MHz.

FIG. 4 is a diagram illustrating a system DC carrier in association with resource blocks within a system transmission bandwidth in an LTE/LTE-A system operating with the downlink system transmission bandwidth of 3 MHz, 5 MHz, or 15 MHz.

As shown in FIG. 4, the number of resource blocks 402 and 403 are odd in the system operating with the system transmission bandwidth of 3 MHz, 5 MHz, or 15 MHz. That is, $N_{RB}^{DL}$ is an odd number. Accordingly, there is a center resource block 402 containing 6 subcarriers at each of the both sides of the DC subcarrier 401 and $(N_{RB}^{DL}-1)/2$ resource blocks 403 at each of the both sides of the center resource block 402.

The system DC subcarrier 401 is located at the center of the center resource block 402, but it is regarded as a separate subcarrier that is not included in the center resource block 402. For this reason, the resource block 402 positioned at the center of the system transmission bandwidth appears as if physically containing 13 OFDM subcarriers, unlike the other resource blocks 403; but, like the other resource blocks 403, it contains 12 OFDM subcarriers available for data and control information transmission, with the exclusion of the system DC subcarrier located at the center of the resource block 403. Since the eNB uses a resource block as the basic unit for downlink data transmission to the normal UEs and the low-cost MTC UEs, the data, control information, and reference signal are always transmitted to the UE regardless of the system DC subcarrier as shown in FIG. 4.

The low-cost MTC UE communicates with the eNB in a narrowband region with a bandwidth narrower than that of the system transmission band for low-cost, low complexity communication. That is, the low-cost MTC UE has a limited capability for performing a communication operation in a narrowband region narrower than the system transmission bandwidth of the eNB. For example, the low-cost MTC UE has a capability to transmit and receive signals on a narrow band channel of 1.4 MHz as the smallest system transmission bandwidth supported in LTE/LTE-A and thus always communicates with the eNB in the bandwidth of 1.4 MHz.

Accordingly, the eNB may configure the low-cost MTC UE for communication therewith in one of a plurality of narrowband regions within the system transmission bandwidth. The eNB may also configure the low-cost MTC UE for narrowband communication therewith according to a predetermined frequency hopping pattern. A narrowband region for use by the low-cost MTC UE spans 6 resource blocks, and the system transmission bandwidth contains a plurality of resource blocks arranged without being overlapped with each other.

Since the resource blocks for use by the low-cost MTC UE should be aligned along with the resource blocks for use by the legacy UEs within the system transmission bandwidth, the resource blocks for use by the low-cost MTC UEs and legacy UEs are identical with each other. For this reason, it is difficult for the eNB to locate the DC subcarrier, which is not used for data transmission, in a narrowband region. Accordingly, in the case where the low-cost MTC UE is significantly affected by the DC offset caused by the imperfect RF characteristic of the low-cost MTC UE, the UE has to configure a DC subcarrier appropriately and puncture the signals mapped to the corresponding subcarrier. That is, it is necessary for the UE to configure a narrowband DC subcarrier that is different from the system DC subcarrier to handle the signal transmitted on the corresponding subcarrier in a certain manner.

Figure 5:
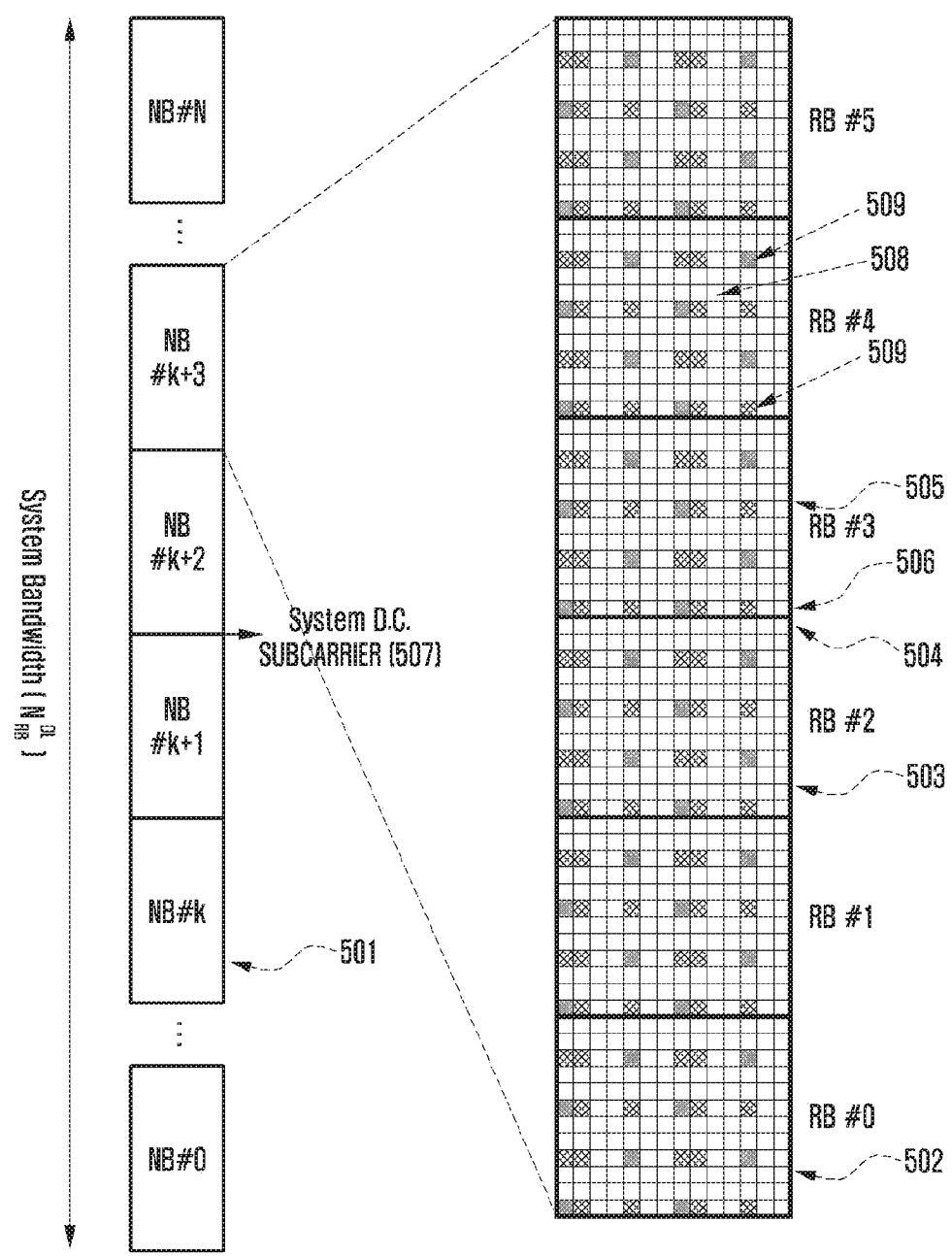
FIG. 5 is a diagram illustrating narrowband regions for communication of a low-cost MTC UE within a downlink system transmission bandwidth of an LTE/LTE-A system.

FIG. 5 is a diagram illustrating narrowband regions for communication of a low-cost MTC UE within a downlink system transmission bandwidth of an LTE/LTE-A system.

As shown in FIG. 5, the system transmission bandwidth contains a plurality of narrowband regions 501 for use by low-cost MTC UEs. In this embodiment, it is assumed that the narrowband region has a bandwidth of 1.4 MHz. As described above, each narrowband region 501 spans 6 resource blocks 502 that are not overlapped with each other. Although no narrowband region 501 is overlapped with the system DC subcarrier 507 in FIG. 5, the present invention is not limited thereby and includes the embodiments in which a narrowband region is overlapped with the system DC subcarrier 507. Even in such embodiments, the system DC subcarrier 507 is not included in the corresponding narrowband resource block 502. The narrowband regions 501 may be sequentially delimited from one or both of the two ends of the system transmission bandwidth. It may also be possible to sequentially delimit the narrowband regions 501 from the center of the system transmission bandwidth to both ends of the system transmission bandwidth. Regardless of the method for delimiting the narrowband regions 501 in the system transmission bandwidth, it is possible to achieve the objects of the present invention. A low-cost MTC UE can receive downlink signals transmitted by an eNB in one of the narrowband regions 501 according to a configuration of the eNB or a predetermined rule.

As shown in FIG. 5, each of the resource blocks 502 forming one narrowband region 501 includes null subcarriers 510 for cell-specific reference signal (CRS) 509 for use in channel estimation and equalization and CRS being transmitted through other antenna ports as well as resource elements (REs) 508 for data and control information transmission. Also, a demodulation reference signal (DMRS) may be mapped in the resource block 502 according to the UE-specific transmission mode configured by the eNB.

In the case where the UE receives a downlink signal in the narrowband region (NB#k+3) as shown in FIG. 5, the UE may configure the $12^{th}$ subcarrier 504 of the RB#2 503 or the $1^{st}$ subcarrier 506 of the RB#3 505 that are located around the middle of the 6 resource blocks as the narrowband DC subcarrier.

Accordingly, the UE may not perform demodulation on the downlink signal carried on the corresponding subcarrier when the DC offset is large. However, it may also be possible for the low-cost MTC UE to configure the $1^{st}$ subcarrier 506 of the resource block RB#3 505 as the narrowband DC subcarrier for receiving downlink signals and skip receiving data and CRS at all REs within a subframe corresponding to the subcarrier 506.

That is, the UE may puncture the data and CRS on the corresponding subcarrier. Although the UE performs puncturing on the data RE, this has little effect on the downlink reception performance because of the use of a forward error correction (FEC) code. In the case of puncturing CRS, however, the UE cannot perform channel estimation on the corresponding frequency and this means channel estimation performance degradation, resulting in data reception performance degradation of the low-cost MTC UE. There is therefore a need of a rule for a low-cost MTC UE to select the best narrowband DC subcarrier in receiving downlink signals in a narrowband region.

The problem of collision between the reference signal and the narrowband DC subcarrier may occur even when the UE uses DMRS as well as CRS for channel estimation and equalization. Here, the downlink DMRS may be transmitted for use by the UE in channel estimation and equalization in both the cases of using MTC-physical downlink control channel (MTC-PDCCH) and MTC-physical downlink shared channel (MTC-PDSCH) for transmitting low-cost MTC UE control information. The MTC-PDCCH is a physical channel for transmitting control information to the low-cost MTC UE, and MTC-PDSCH is a physical channel for transmitting data to the low-cost MTC UE.

First Embodiment

The downlink signal reception method according to the first embodiment of the present invention is capable of allowing a low-cost MTC UE that receives downlink signals in a narrowband region to designate a narrowband DC subcarrier based on the cell ID of the eNB in the case of using CRS for data demodulation on MTC-PDCCH or MTC-PDSCH transmitted in the narrowband region in order to solve the above-described problem. In the first embodiment, the UE may select a subcarrier to which no CRS is mapped as the narrowband DC subcarrier.

According to TS36.211 related to LTE/LTE-A physical layer transmission, the subcarrier index k and OFDM symbol index 1 of an RE to which CRS is mapped in a subframe may be determined by equations (2).

$$k = 6m + (v + v_{shift}) \bmod 6$$

$$l = \begin{cases} 0, N_{symb}^{DL} - 3 & \text{if } p \in \{0, 1\} \\ 1 & \text{if } p \in \{2, 3\} \end{cases}$$

$$m = 0, 1, \ldots, 2 \cdot N_{RB}^{DL} - 1$$

$$m' = m + N_{RB}^{max,DL} - N_{RB}^{DL}$$

$$v = \begin{cases} 0 & \text{if } p = 0 \text{ and } l = 0 \\ 3 & \text{if } p = 0 \text{ and } l \neq 0 \\ 3 & \text{if } p = 1 \text{ and } l = 0 \\ 0 & \text{if } p = 1 \text{ and } l \neq 0 \\ 3(n_s \bmod 2) & \text{if } p = 2 \\ 3 + 3(n_s \bmod 2) & \text{if } p = 3 \end{cases}$$

$$v_{shift} = N_{ID}^{cell} \bmod 6$$

Equations (2)

where $n_s$ denotes a slot index, $N_{RB}^{DL}$ denotes a number of resource blocks in max L the downlink system transmission bandwidth, $N_{RB}^{max,DL}$ denotes a number of resource blocks in the maximum downlink system transmission bandwidth in LTE, and $N_{symb}^{DL}$ denotes a number of OFDM symbols in a downlink subframe.

Also, $N_{ID}^{cell}$ denotes a cell number of a cell to which the UE is currently connected. In equations (2), it is shown that the RE position to which CRS is mapped varies according to the cell number (cell ID).

Accordingly, if the UE selects the narrowband DC subcarrier based on the cell number of the eNB, it may be possible to solve the problem of failing in receipt of CRS in the narrowband DC subcarrier. That is, the UE may check the CRS mapping positions of a cell based on the cell number and select a subcarrier to which no CRS is mapped as the narrowband DC subcarrier. It may also be possible for the UE to select one of the subcarriers to which no CRS is mapped (or allocated) and which is closest to the center frequency of the narrowband region assigned to the UE as the narrowband DC subcarrier.

Figure 6:
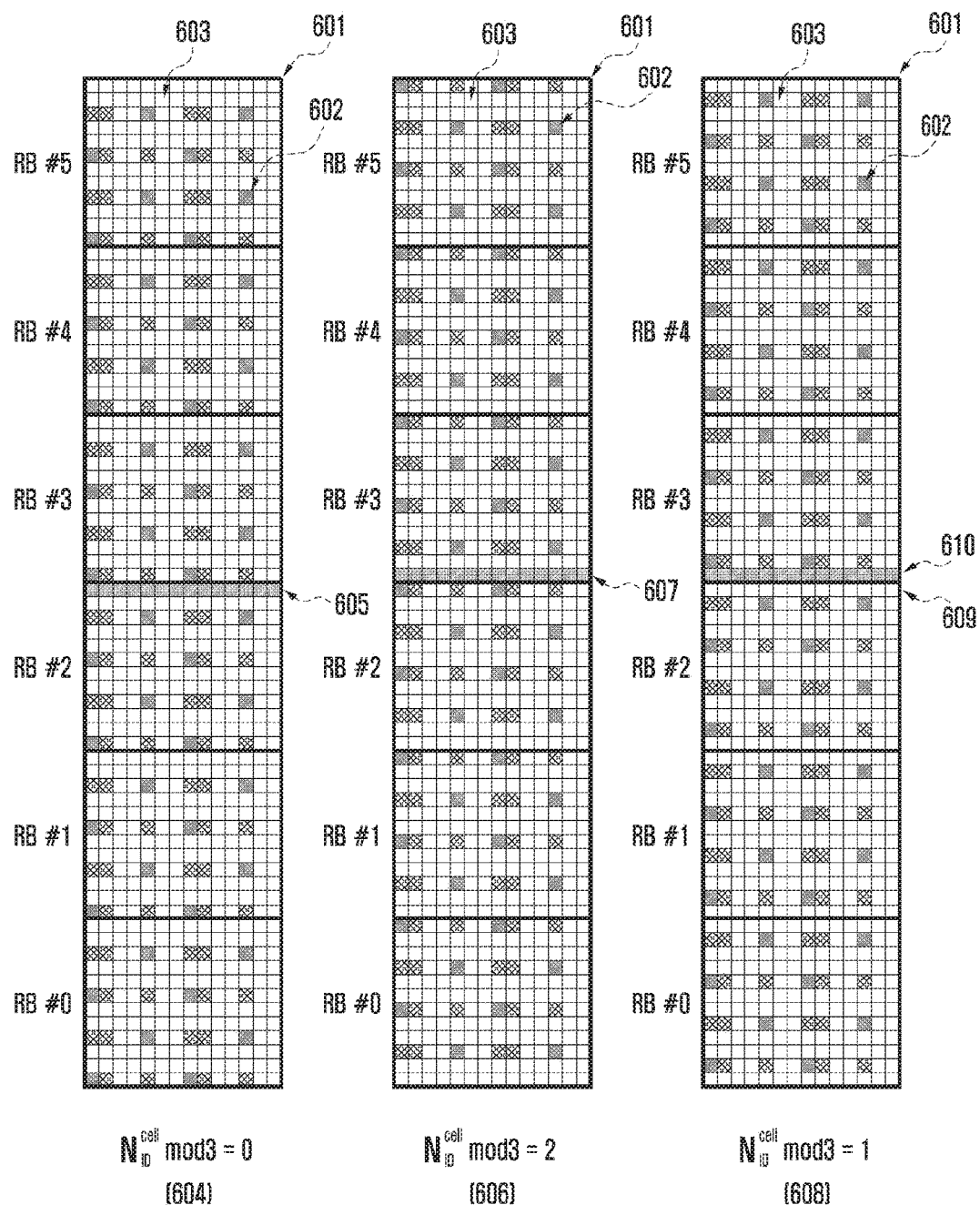
FIG. 6 is a diagram illustrating a method for selecting a non-CRS subcarrier as a narrowband DC subcarrier for a low-cost MTC UE which uses CRS for downlink signal demodulation according to the first embodiment of the present invention.

FIG. 6 is a diagram illustrating a method for selecting a non-CRS subcarrier as a narrowband DC subcarrier for a low-cost MTC UE that uses CRS for downlink signal demodulation according to the first embodiment of the present invention.

As shown in FIG. 6, a narrowband region 601 for transmitting a physical channel being demodulated based on CRS may include data REs 603 for data transmission and CRS REs 602 for CRS transmission through certain antenna ports, and empty REs not used for any signal transmission to avoid interference to CRS transmitted through other antenna ports. Although FIG. 6 is directed to a case where 4 antenna ports are configured, the present invention is applicable to the case where the number of antenna ports is 1 or 2 with slight modification without departing from the spirit and scope of the present invention.

It is preferable for the low-cost MTC UE to configure the narrowband DC subcarrier at the center of the narrowband region in order to facilitate implementation of RF and baseband sections of the UE. In the embodiment of FIG. 6, however, it is proposed that the low-cost MTC UE configures a subcarrier carrying CRS for use in downlink signal demodulation as the narrowband DC subcarrier based on the first embodiment of the present invention.

As shown in FIG. 6, if the cell number estimated by the low-cost MTC UE fulfils the condition of $N_{ID}^{cell} \bmod 3=0$ as denoted by reference number 604, the UE configures the $12^{th}$ subcarrier 605 of the resource block RB#2 as the narrowband DC subcarrier in the corresponding narrowband region to avoid collision with CRS in the frequency domain according to the first embodiment of the present invention. That is, from between the $12^{th}$ subcarrier 605 of the resource block RB#2 and the $1^{st}$ subcarrier of the resource block RB#3, the UE selects the $12^{th}$ subcarrier 605 to which no CRS is mapped in resource block RB#2 as the narrowband DC subcarrier.

If the cell number estimated by the low-cost MTC UE fulfils the condition of $N_{ID}^{cell} \bmod 3=2$ as denoted by reference number 606, the UE configures the $1^{st}$ subcarrier 607 of the resource block RB#3 as the narrowband DC subcarrier to avoid collision with CRS in the frequency domain according to the first embodiment of the present invention. That is, from between the $12^{th}$ subcarrier 605 of the resource block RB#2 and the $1^{st}$ subcarrier of the resource block RB#3, the UE selects the $1^{st}$ subcarrier 607 to which no CRS is mapped in the resource block RB#3 as the narrowband DC subcarrier.

Meanwhile, if the cell number estimated by the low-cost MTC UE fulfils the condition of $N_{ID}^{cell} \bmod 3=1$ as denoted by reference number 608, this means that no CRS is mapped to the two subcarriers positioned around the center of the corresponding narrowband region. In this case, the low-cost MTC UE can configure either the $12^{th}$ subcarrier of the resource block RB#2 or the $1^{st}$ subcarrier of the resource block RB#3 as the narrowband DC subcarrier of the corresponding narrowband region in the frequency domain. According to the first embodiment of the present invention, once the narrowband DC subcarrier is configured, the low-cost MTC UE performs demodulation on downlink signals using a QPSK/QAM symbol generated randomly by the UE for the corresponding subcarrier or an arbitrary QPSK/QAM symbol rather than using any QPSK/QAM symbol carried on the subcarrier selected by the UE.

Second Embodiment

In order to receive MTC-PDCCH (M-PDCCH) in a narrowband region to acquire downlink control information, a low-cost MTC UE has to receive DMRS for M-PDCCH demodulation. In the case that the narrowband DC subcarrier which the UE does not use for receiving downlink signal to minimizing the impact of the DC offset is a subcarrier carrying DMRS, the UE cannot perform channel estimation and equalization at the corresponding REs, resulting in M-PDCCH reception performance degradation. The downlink signal reception method according to the second embodiment of the present invention is capable of minimizing the M-PDCCH reception performance degradation of the low-cost MTC UE in order to solve the above-described problem.

In an LTE/LTE-A system, M-PDCCH for a low-cost MTC UE is based on enhanced PDCCH (EPDCCH). The DMRS is configured in the same manner for both the M-PDCCH and EPDCCH. According to TS36.211 related to LTE/LTE-A physical layer transmission, the subcarrier index k and OFDM symbol index 1 of an RE to which DMRS of EPDCCH is mapped may be are determined by equations (3).

$$k = 5m' + N_{sc}^{RB} n_{PRB} + k' \quad \text{Equations (3)}$$

$$k' = \begin{cases} 1 & p \in \{107, 108\} \\ 0 & p \in \{109, 110\} \end{cases}$$

$$l = \begin{cases} l' \bmod 2 + 2 & \text{if in a special subframe with configuration 3, 4, 8 or 9} \\ l' \bmod 2 + 2 + 3\lfloor l'/2 \rfloor & \text{if in a special subframe with configuration 1, 2, 6, or 7} \\ l' \bmod 2 + 5 & \text{if not in a special subframe} \end{cases}$$

$$l' = \begin{cases} 0, 1, 2, 3 & \text{if } n_s \bmod 2 = 0 \text{ and in a special subframe with configuration 1, 2, 6, or 7} \\ 0, 1 & \text{if } n_s \bmod 2 = 0 \text{ and not in a special subframe with configuration 1, 2, 6, or 7} \\ 2, 3 & \text{if } n_s \bmod 2 = 1 \text{ and not in a special subframe with configuration 1, 2, 6, or 7} \end{cases}$$

$$m' = 0, 1, 2$$

Figure 7:
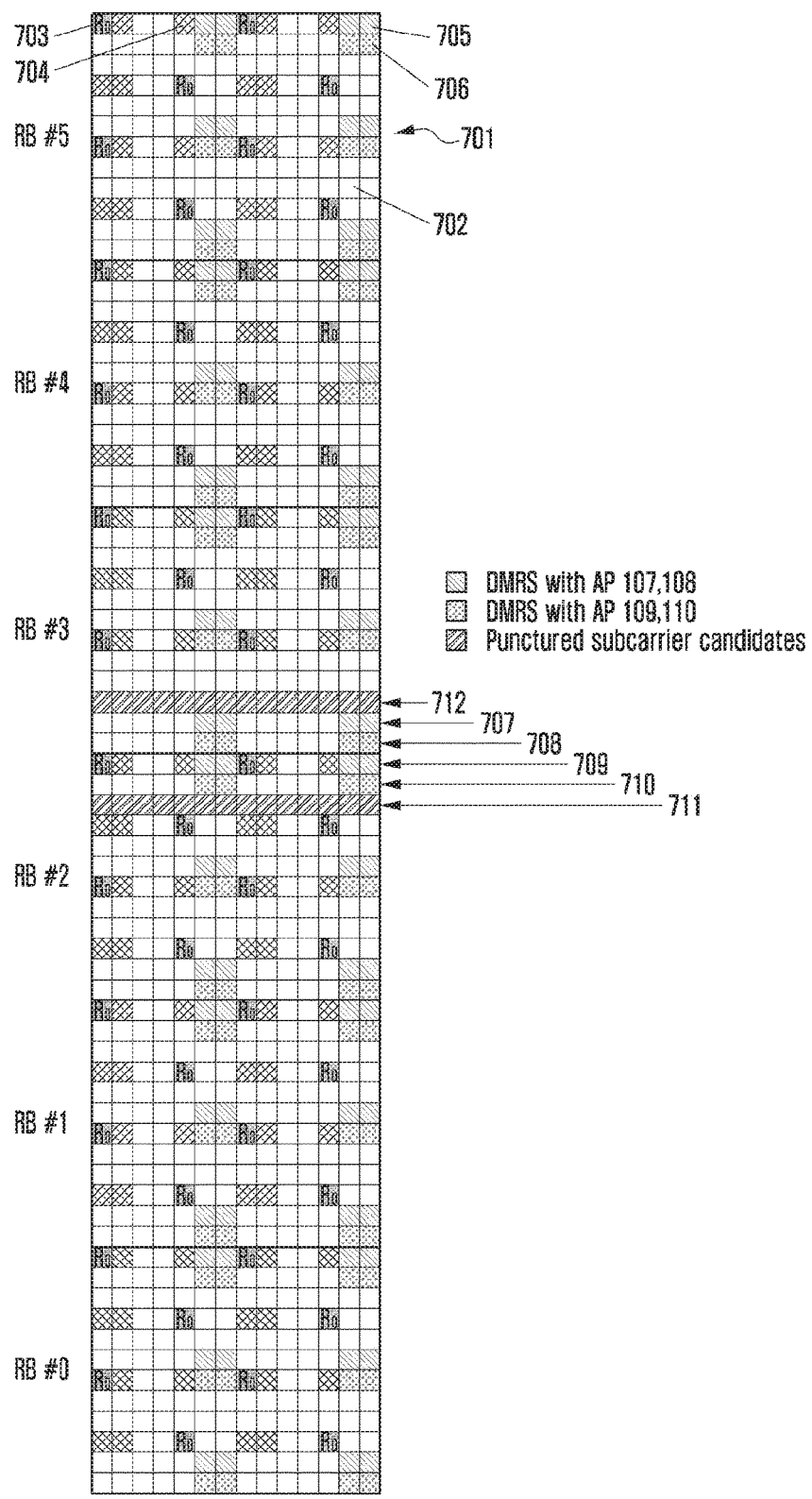
FIG. 7 is a diagram illustrating a DMRS pattern for M-PDCCH and a narrowband DC subcarrier for use in an LTE/LTE-A system according to the second embodiment of the present invention.

FIG. 7 is a diagram illustrating a DMRS pattern for M-PDCCH and a narrowband DC subcarrier for use in an LTE/LTE-A system.

In FIG. 7, a resource block 701 includes control REs 702 for transmitting M-PDCCH control information and CRS REs 703 for transmitting CRS in association with certain antenna ports, DMRS REs 705 and 706 for transmitting DMRS, and empty REs 704 not used for any signal transmission to minimize interference with CRS transmitted through other antenna ports.

The REs to which DMRS for M-PDCCH demodulation is mapped include the DMRS REs 705 for DMRS transmission through the antenna ports 107 and 108 and the DMRS REs 706 for DMRS transmission through the antenna ports 109 and 110. The M-PDCCH is generated with a precoder cycling to improve coverage enhancement and thus the low-cost MTC UE must always receive all DMRS transmitted through the antenna ports 107, 108, 109, and 110 in the resource block 701 in which the M-PDCCH is transmitted for M-PDCCH demodulation. Accordingly, if the M-PDCCH for the low-cost MTC UE is located in the center resource blocks of a narrowband region (e.g., RB#2 or RB#3 in FIG. 7), the low-cost MTC UE has to select the narrowband DC subcarrier in consideration of the DMRS RE positions for receiving the DMRS of M-PDCCH. The UE may configure the subcarrier to which no DMRS is mapped (or assigned) among the subcarriers closest to the center frequency of the narrowband region allocated thereto.

According to the second embodiment of the present invention, method 1 is characterized in that the low-cost MTC UE selects a subcarrier carrying no DMRS as the narrowband DC subcarrier to minimize M-PDCCH demodulation performance degradation caused by DC offset. In the case that the M-PDCCH for the low-cost MTC UE is positioned in the center resource blocks of the narrowband region (e.g., RB#2 and RB#3 in FIG. 7), the UE must always receive signals on the $11^{th}$ and $12^{th}$ subcarriers 710 and 709 of the resource block RB#2 and the $1^{st}$ and $2^{nd}$ subcarriers 708 and 707 of the resource block RB#3 for DMRS-based channel estimation. Accordingly, it is proposed that the low-cost MTC UE selects the $10^{th}$ subcarrier 711 of the resource block RB#2 or the $3^{rd}$ subcarrier 712 of the resource block RB#3 as the narrowband DC subcarrier for receiving M-PDCCH.

It may be possible to arbitrarily select one of the $10^{th}$ subcarrier 711 of the resource block RB#2 or the $3^{rd}$ subcarrier 712 of the resource block RB#3 as the narrowband DC subcarrier and, if one of the two subcarriers carries CRS, the other one. That is, the low-cost MTC UE may select the $3^{rd}$ subcarrier 712 of the resource block RB#3 as the narrowband DC subcarrier for the case where the $10^{th}$ subcarrier 711 of the resource block RB#2 carries CRS or the $10^{th}$ subcarrier 711 of the resource block RB#2 as the narrowband DC subcarrier for the case where the $3^{rd}$ subcarrier 712 of the resource block RB#3 carries CRS as the narrowband DC subcarrier. It may be possible for the UE to configure the subcarrier carrying neither CRS nor DMRS between the subcarriers closest to the center frequency of the narrowband region allocated thereto as the narrowband DC subcarrier.

According to the second embodiment of the present invention, method 2 is characterized in that the low-cost MTC UE selects one of the subcarriers carrying DMRS for M-PDCCH demodulation as the narrowband DC subcarrier as a way of minimizing—PDCCH reception performance degradation. If one of the $12^{th}$ subcarrier 709 of the resource block RB#2 or the $1^{st}$ subcarrier 708 of the resource block RB#3 that are center subcarriers of the narrowband region is selected as the narrowband DC subcarrier, the low-cost MTC UE cannot receive DMRS on the subcarrier selected as the narrowband DC subcarrier and cannot perform channel estimation on corresponding DMRS REs. There is therefore a need of using a channel estimation value obtained based on a certain DMRS as a substitute of the channel estimation value that should be obtained based on the DMRS on the narrowband DC subcarrier.

In this case, the substitute channel estimation value is the channel estimation value acquired based on the DMRS that is identical in antenna port with the DMRS on the narrowband DC subcarrier and which is carried on the subcarrier closest to the narrowband DC subcarrier. For example, if the $12^{th}$ subcarrier 709 of the resource block RB#2 is selected as the narrowband DC subcarrier, the low-cost MTC UE cannot receive DMRS of antenna ports 107 and 108 on the corresponding subcarrier. In this case, the channel estimation value for the antenna ports 107 and 108 on the subcarrier 709 may be replaced by the channel estimation value for the antenna ports 107 and 108 on the subcarrier 707. Likewise, if the $1^{st}$ subcarrier 708 of the resource block RB#2 is selected as the narrowband DC subcarrier, the low-cost MTC UE cannot receive DMRS of antenna ports 109 and 110. In this case, the channel estimation for the antenna ports 109 and 110 on the subcarrier 708 may be replaced by the channel estimation value for the antenna ports 109 and 110 on the subcarrier 710.

When an eNB transmits data to UEs within a cell through PDCCH, the DMRSs of the antenna ports are mapped to different REs according to the transmission mode that the eNB configures per UE. The low-cost MTC UE also has to receive MTC-PDCCH in the transmission mode configured by the eNB and DMRS at the DMRS RE positions of the antenna ports that are determined according to the transmission mode. Accordingly, it is proposed that the low-cost MTC UE which receives MTC-PDSCH also selects one of the subcarriers carrying no DMRS as the narrowband DC subcarrier to minimize impact of the DC offset.

According to the second embodiment of the present invention, once the narrowband DC subcarrier is configured, the low-cost MTC UE performs demodulation on downlink signals using a QPSK/QAM symbol generated randomly by the UE for the corresponding subcarrier or an arbitrary QPSK/QAM symbol rather than using any QPSK/QAM symbol carried on the subcarrier selected by the UE.

Third Embodiment

Figure 8:
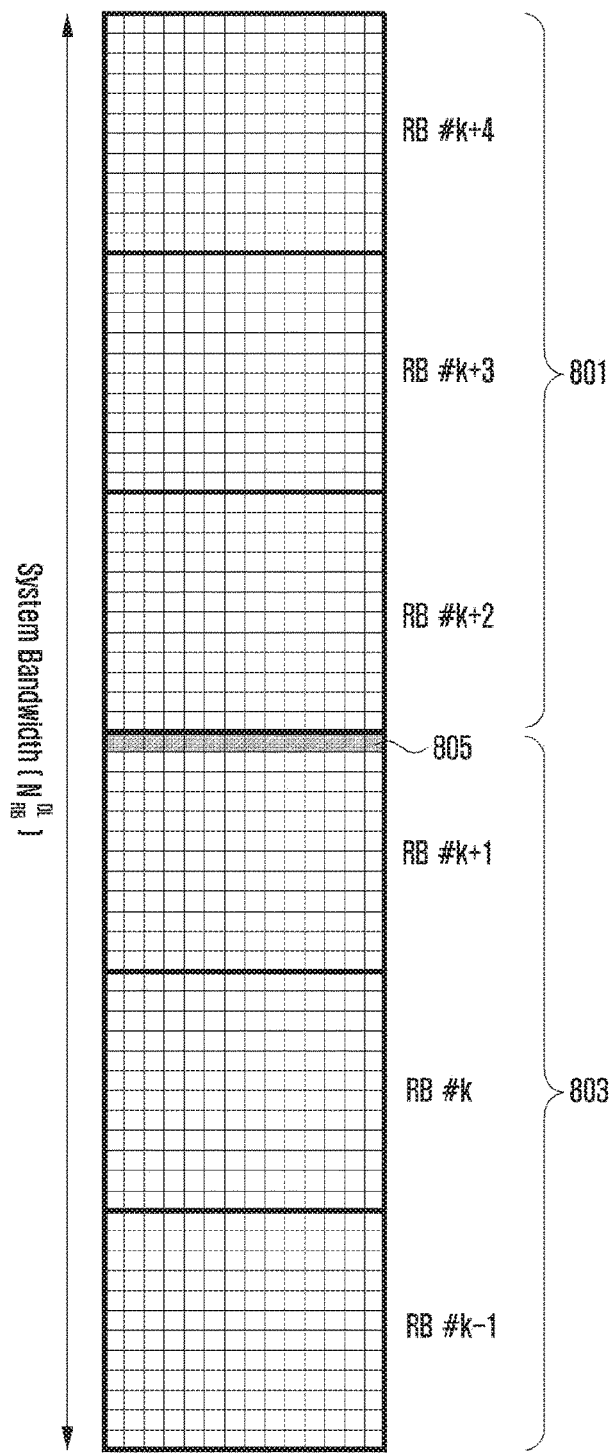
FIG. 8 is a diagram illustrating a narrowband DC subcarrier selection method according to the third embodiment of the present invention.

FIG. 8 is a diagram illustrating a narrowband DC subcarrier selection method according to the third embodiment of the present invention.

An eNB is capable of using all or some of resource blocks constituting a narrowband region to transmit MTC-PDCCH and MTC-PDSCH to a low-cost MTC UE according to a transport block size (TBS) or a coverage enhancement value necessary for receiving the corresponding downlink signal errorlessly. In the case that the eNB uses some of the resource blocks constituting the narrowband region, as shown denoted by reference number 801 in FIG. 8, for downlink signal transmission, the remaining resource blocks 803 may be used for downlink signal transmission to another low-cost MTC UE or a normal LTE UE.

In the case that the eNB uses all resource blocks of the narrowband region to transmit MTC-PDCCH and MTC-PDSCH to a low-cost MTC UE, the UE has to select the narrowband DC subcarrier according to the method of the first or second embodiment to minimize the impact of the DC offset in receiving the corresponding channels.

Meanwhile, in the case that the eNB uses some of the resource blocks of the narrowband region to transmit MTC-PDCCH and MTC-PDSCH to a low-cost MTC UE, selection by the low-cost MTC UE of the narrowband DC subcarrier in the resource blocks 803 remaining after allocating the resource blocks 801 to the corresponding UE may be considered to minimize the impact of the DC offset.

For example, if the eNB uses part 801 (e.g., all of the resource blocks RB#k+2, RB#k+3, and RB#k+4 or any combination of them) of the resource blocks constituting the narrowband region to transmit MTC-PDCCH and MTC-PDSCH to the low-cost MTC UE, the low-cost MTC UE may configure one of subcarriers of the resource blocks 803 remaining after allocating the resource blocks 801 as the narrowback DC subcarrier. In this case, although it is efficient to configure a subcarrier close to the resource blocks in use for receiving MTC-PDCCH and MTC-PDSCH as the narrowband DC subcarrier as denoted by reference number 805, the present invention is not limited thereby and may include embodiments in which any subcarrier of the remaining resource blocks 803 is configured as the narrowband DC subcarrier. Because the eNB configures in advance a narrowband region and the resource blocks selected in the narrowband region for use by the UE in receiving MTC-PDCCH, the UE is capable of configuring the narrowband DC subcarrier in receiving MTC-PDCCH. Because the eNB is capable of notifying the low-cost MTC UE of the narrowband region and resource blocks selected in the narrowband region for use by the UE in receiving MTC-PDSCH using downlink control information (DCI), the UE may configure the narrowband DC subcarrier based on the corresponding information.

In an alternative embodiment of the third embodiment of the present invention, the low-cost MTC UE may select one of subcarriers in the resource blocks of one of narrowband regions remaining after allocating, by the eNB, the narrowband region for transmitting MTC-PDCCH and MTC-PDSCH to the UE as the narrowband DC subcarrier. This embodiment is advantageous in terms of being applied regardless of whether the eNB uses all resource blocks of the narrowband region for transmitting MTC-PDCCH and MTC-PDSCH.

For example, if the eNB use the resource block RB#k+3 of a narrowband region for transmitting MTC-PDCCH and MTC-PDSCH to the low-cost MTC UE, the low-cost MTC UE may configure one of the subcarriers of neighboring narrowband region #k+4 or #k+2 as the narrowband DC subcarrier. In order to realize the method according to the alternative embodiment of the third embodiment of the present invention, it is necessary for the UE to secure a RF and baseband bandwidth broader than the that of the narrowband region. The above-described narrowband DC subcarrier configuration method is advantageous in terms of receiving data symbols as well as reference signals in the resource blocks allocated for use by the UE in receiving downlink signals without signal loss caused by the narrowband DC subcarrier.

Figure 9:
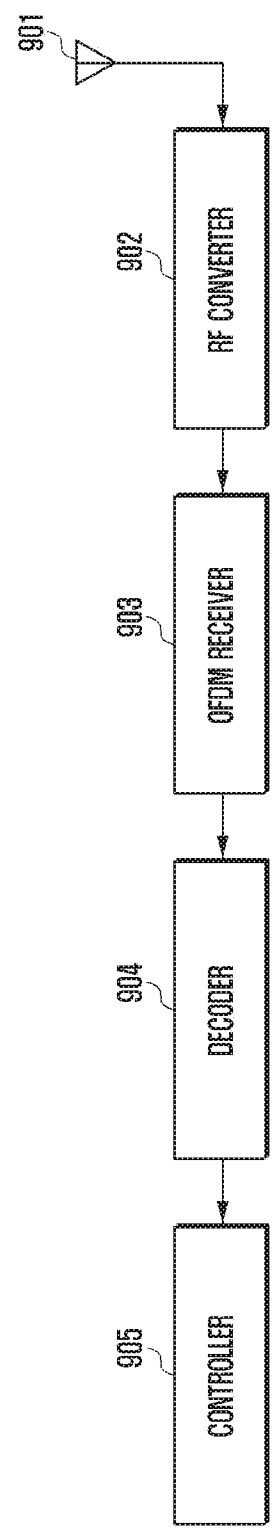
FIG. 9 is a block diagram illustrating a receiving device of a low-cost MTC UE according to an embodiment of the present invention.

FIG. 9 is a block diagram illustrating a receiving device of a low-cost MTC UE according to an embodiment of the present invention.

As shown in FIG. 9, the receiving device of the low-cost MTC UE may include an antenna 901 capable of receiving narrowband signals, a radio frequency (RF) converter 902, an OFDM receiver 903, a decoder 904, and a controller 905. However, the UE is not limited to the above configuration. For example, the UE may include a transceiver for transmitting and receiving signals and a controller for controlling the overall operation of the UE.

The antenna 901 of the low-cost MTC UE converts a downlink passband signal transmitted by an eNB to an electric signal and sends the electric signal to the RF converter 902. The RF converter 902 down-converts the signal from the antenna 901 to a baseband signal and performs a narrowband filtering on the baseband signal for the UE. When the RF converter 902 converts the downlink passband signal to the baseband signal, the center frequency for use by the UE in down-conversion is determined according to the narrowband DC subcarrier which is determined by the low-cost MTC UE according to one of the first, second, third embodiments of the present invention. A description thereof is made with reference to FIG. 10.

The baseband signal generated through down-conversion by the RF converter 902 is sent to the OFDM receiver 903, which perform OFDM demodulation thereon. The OFDM receiver 903 includes a cyclic prefix remover, a fast Fourier transform (FFT) processor, and a re-mapper for converting an OFDM signal to a QPSK/QAM signal. Any QPSK/QAM symbol carried on the narrowband DC subcarrier selected by the low-cost MTC UE according to one of the first, second, and third embodiments of the present invention is not used by the UE in demodulation. Instead, the UE may use an arbitrarily-generated QPSK/QAM symbol or a specific QPSK/QAM symbol as the QPSK/QAM symbol on the corresponding subcarrier. The decoder 904 extracts a bit-level signal transmitted by the eNB from the QPSK/QAM symbol generated by the OFDM receiver 903 and corrects errors that occur between the transmitter of the eNB and the receiver of the UE using an error correction code, the error-corrected signal being input and sent to the controller 905. The controller 905 controls the UE operation or delivers the received information to an upper layer according to the type of the information received from the eNB.

According to an embodiment of the present invention, the controller of the UE may control the UE to configure one of the subcarriers of narrowband frequency resource allocated to the UE, receive signals transmitted by an eNB on the narrowband frequency resource, and decode the received signal based on the configured narrowband DC subcarrier. The narrowband DC subcarrier may be one of the subcarriers forming one of the resource blocks constituting a narrowband region.

According to an embodiment of the present invention, the controller may control the UE to select a subcarrier close to the center frequency of the narrowband region among the subcarriers with the exception of the subcarrier to which any reference signal is mapped in the narrowband region.

According to an embodiment of the embodiment of the present invention, the controller may control the UE to select one of the subcarriers with the exception of the subcarriers to which a cell-specific reference signal (CRS) is mapped as the narrowband DC subcarrier based on a cell ID. The controller may also control the UE to select one of the subcarriers with the exception of the subcarriers to which a DMRS is mapped as the narrowband DC subcarrier. The controller may also control, when part of a narrowband region is allocated to a UE, the UE to select one of the subcarriers of the remaining part of the narrowband region as the narrowband DC subcarrier. The controller may also control the UE to select one of the subcarriers of one of the narrowband regions with the exception of the narrowband region allocated to the UE as the narrowband DC subcarrier.

According to an embodiment of the present invention, information on one of a reference signal and data signal may be transmitted to the UE through the narrowband DC subcarrier. That is, because the narrowband DC subcarrier is configured by the UE rather than by the eNB, the eNB is capable of transmitting the reference signal or data signal on the frequency resources corresponding to the narrowband DC subcarrier regardless of the narrowband DC subcarrier configured by the UE.

According to an embodiment of the present invention, the controller may control to down-convert the received signal to a baseband signal based on the configured narrowband DC subcarrier. The controller may also control to use an arbitrary modulation symbol or a predetermined modulation symbol instead of the modulation symbol mapped to the narrowband DC subcarrier to receive the signal transmitted by the eNB on the corresponding subcarrier. The controller may also control to perform remapping to compensate the FFT output index of the received signal based on the narrowband DC subcarrier.

Figure 10:
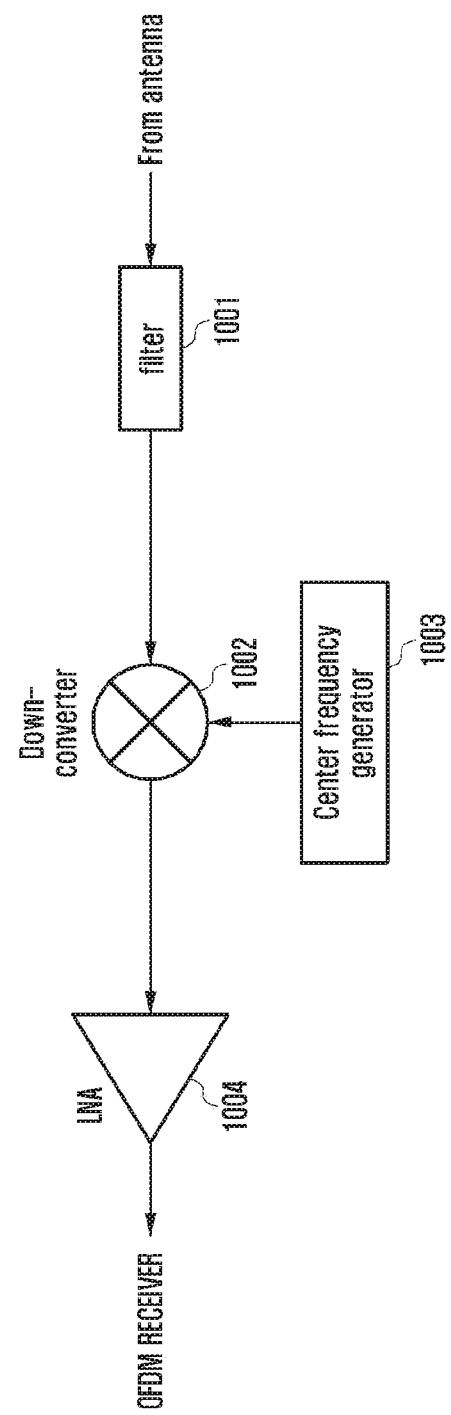
FIG. 10 is a circuit diagram illustrating a configuration of the RF converter of the receiving device of the low-cost MTC UE of FIG. 9.

FIG. 10 is a circuit diagram illustrating a configuration of the RF converter of the receiving device of the low-cost MTC UE of FIG. 9.

In reference to FIG. 10, the RF converter 902 of the low-cost MTC UE includes a filter 1001, a down-converter 1002, a center frequency generator 1003, and a low noise amplifier (LNA) 1004. The filter 1001 has a passband (typically broader than narrowband) to pass the desired downlink signal. The signal filtered by the filter 1001 is sent to the down-converter 1002, which down-converts the filtered signal to a baseband signal. The center frequency generator 1003 inputs a continuous wave (CW) signal corresponding to a center frequency to the down-converter 1002 for use in converting the passband downlink signal to the baseband signal. The down-converter 1002 has to perform down-conversion based on the center frequency of a narrowband region allocated to the UE for downlink reception rather than the center frequency of the system transmission band. The center frequency may be changed according to the narrowband DC subcarrier selected by the low-cost MTC UE according to one of the first, second, and third embodiments of the present invention. According to one of the first to third embodiments of the present invention, the center frequency generator 1003 of the low-cost MTC UE may generate the center frequency using equation (4).

$$f_{UE\_Center} = \begin{cases} f_{NB\_Center} + (k-1) \cdot 15 \text{ KHz} + 7.5 \text{ kHz}, k \geq 1 \\ f_{NB\_Center} + (k+1) \cdot 15 \text{ KHz} - 7.5 \text{ kHz}, k \leq -1 \end{cases} \quad \text{Equation (4)}$$

In equation (4), $f_{NB\_center}$ denotes the center frequency of a narrowband region for use by the low-cost MTC UE in receiving signals, and $f_{UE\_center}$ denotes the center frequency of the narrowband DC subcarrier selected according to one of the first to third embodiments of the present invention. In equation (4), k denotes a subcarrier frequency space indicative of a distance from the center of the narrowband region to the selected narrowband DC subcarrier; k is a negative value for the case where the narrowband DC subcarrier is included in the resource block with a low index from the center of the narrowband region or a positive value for the case where the narrowband DC subcarrier is included in the resource block with a high index from the center of the narrowband region.

For example, if the 12$^{th}$ subcarrier 605 of the resource block RB#2 is selected as the narrowband DC subcarrier according to the first embodiment of the present invention, k is −1; thus, the center frequency generator generates the center frequency for narrowband signal reception by substituting k=−1 to equation (4). If the 1$^{st}$ subcarrier 605 of the resource block RB#3 is selected as the narrowband DC subcarrier according to the first embodiment of the present invention, k is 1; thus, the center frequency generator generates the center frequency for narrowband signal reception by substituting k=1 to equation (4). The downlink signal down-converted by the down-converter 1002 is amplified by the LNA 1004 and then input to the OFDM receiver.

Figure 11:
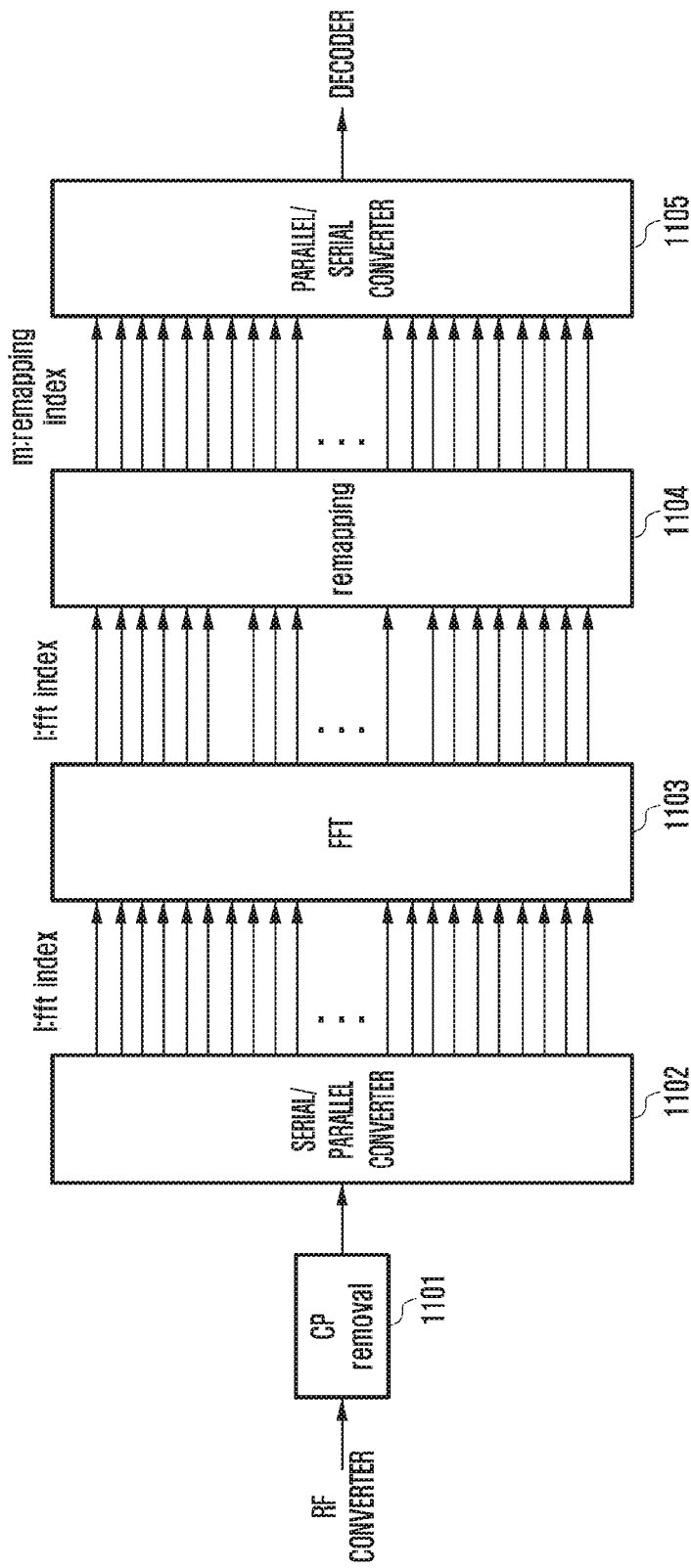
FIG. 11 is a circuit diagram illustrating a configuration of the OFDM receiver of the receiving device of the low-cost MTC UE of FIG. 9.

FIG. 11 is a circuit diagram illustrating a configuration of the OFDM receiver of the receiving device of the low-cost MTC device of FIG. 9.

In reference to FIG. 11, the OFDM receiver 903 of the low-cost MTC UE includes a cyclic prefix remover 1101, a serial/parallel converter 1102, an FFT processor 1103, a remapping unit 1104, and a parallel/serial converter 1105. The cyclic prefix remover 1101 removes a cyclic prefix before the OFDM symbol transmission for protecting against performance degradation caused by multipath delay. The serial/parallel converter 1102 stores the baseband signal input in series in a unit of an OFDM symbol and then outputs the OFDM symbols in parallel to the FFT processor 1103. The FFT processor 1103 performs FFT with the FFT size corresponding to the bandwidth of the narrowband region for the low-cost MTC UE and outputs a QPSK/QAM symbol to the remapping unit 1104.

The remapping unit 1104 corrects any change of the index of the FFT output that is caused by the narrowband DC subcarrier selection of the low-cost MTC UE according to one of the first to third embodiments of the present invention. The remapping unit 1104 may remap the QPSK/QAM symbol from the FFT processor 1103 through the 1$^{th}$ subcarrier to the m$^{th}$ subcarrier using equation (5).

$$m = \begin{cases} l - (k-1), k \geq 1 \\ l + (k+1), k \leq -1 \end{cases} \quad \text{Equation (5)}$$

In equation (5), k denotes a subcarrier frequency space indicative of a distance from the center of the narrowband region to the selected narrowband DC subcarrier; k is a negative value for the case where the narrowband DC subcarrier is included in the resource block with a low index from the center of the narrowband region or a positive value for the case where the narrowband DC subcarrier is included in the resource block with a high index from the center of the narrowband region. For example, if the $12^{th}$ subcarrier 605 of the resource block RB#2 is selected as the narrowband DC subcarrier according to the first embodiment of the present invention, k is −1; thus, the center frequency generator generates the center frequency for narrowband signal reception by substituting k=−1 to equation (4). If the $1^{st}$ subcarrier 605 of the resource block RB#3 is selected as the narrowband DC subcarrier according to the first embodiment of the present invention, k is 1; thus, the center frequency generator generates the center frequency for narrowband signal reception by substituting k=1 to equation (4). The signal remapped by the remapping unit 1104 is input to the parallel/serial converter 1105, after channel estimation and channel equalization, and then sent to the decoder.

Figure 12:
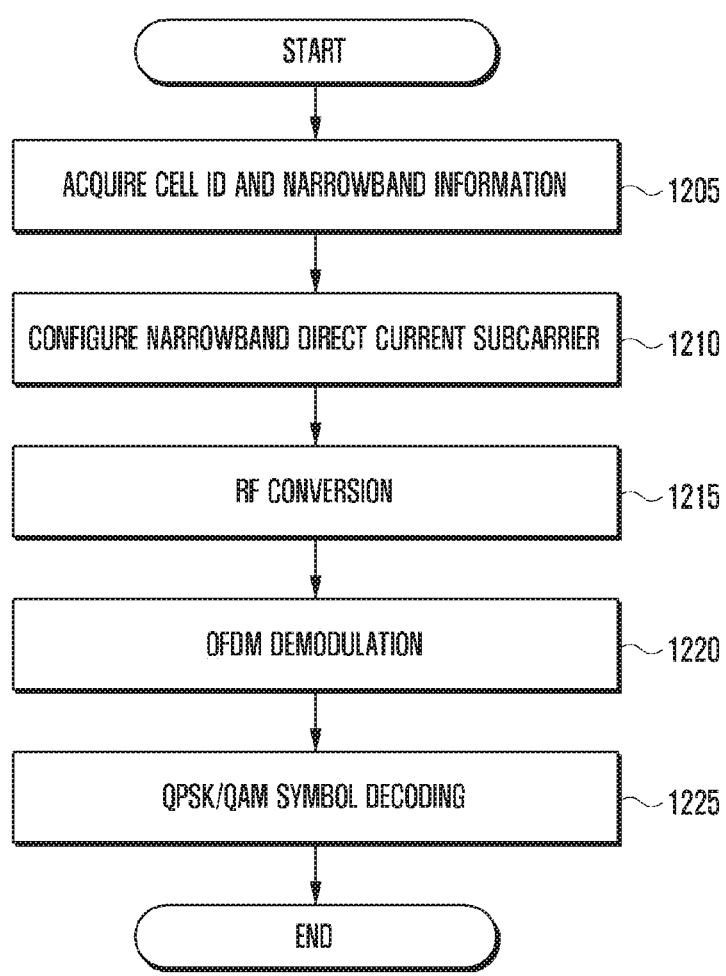
FIG. 12 is a flowchart illustrating an operation of a UE according to an embodiment of the present invention.

FIG. 12 is a flowchart illustrating an operation of a UE according to an embodiment of the present invention.

In reference to FIG. 12, the UE may acquire a cell number (cell ID) and/or information on the narrowband region allocated to the UE at step 1205. The cell number and narrowband region information may be acquired through an alternative process.

At step 1210, the UE may configure a narrowband DC subcarrier. The narrowband DC subcarrier may be configured using the method according to one of the first to third embodiments of the present invention. The narrowband DC subcarrier may be a subcarrier different from the system DC subcarrier of the eNB serving the UE. The narrowband DC subcarrier may be selected or configured among 12 subcarriers (subcarrier columns) forming one of a plurality resource blocks allocated to the UE.

At step 1210, the UE receives a signal transmitted by the eNB.

At step 1215, the UE may perform RF conversion on the received signal. The UE may down-convert the signal received by an antenna to a baseband signal and filter the narrowband signal for the UE. The UE may use the frequency of the narrowband DC subcarrier in the down-conversion process. For more details on RF conversion, see descriptions made with reference to FIGS. 9 and 10.

At step 1220, the UE performs OFDM demodulation. The UE performs CP removal, FFT, remapping, and channel estimation and equalization operations. According to an embodiment of the present invention, the UE does not use any QPSK/QAM symbol on the narrowband DC subcarrier selected by the UE in received signal demodulation. In this case, the UE may use an arbitrarily generated QPSK/QAM symbol or a predetermined QPSK/QAM symbol instead of the QPSK/QAM symbol on the narrowband DC subcarrier. For more detail on OFDM demodulation, see descriptions made with reference to FIGS. 9 and 11.

At step 1225, the UE may perform decoding on the QPSK/QAM symbol. The UE may extract a bit-level signal transmitted by the eNB from the QPSK/QAM symbol generated by the OFDM receiver and correct errors occurring between the transmitter of the eNB and the receiver of the UE; the error corrected signal is sent to the controller of the UE. The controller may control the operation of the UE based on the extracted signal or deliver the received information to a higher layer in the UE.

Although the embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention. If necessary, the embodiments may be combined in whole or in part.

The invention claimed is:

1. A narrowband communication terminal for receiving a downlink signal, the terminal comprising:
   a transceiver for transmitting and receiving signals; and
   at least one processor configured to:
      configure one of subcarriers forming a narrowband frequency region allocated to the terminal as a narrowband direct current (DC) subcarrier,
      receive a signal from a base station in the narrowband frequency region, and
      decode the received signal based on symbols received on subcarriers excluding the narrowband DC subcarrier in the narrowband frequency region and symbols generated at the terminal instead of symbols received on the configured narrowband DC subcarrier.

2. The terminal of claim 1, wherein the narrowband DC subcarrier is one of the subcarriers forming one of resource blocks constituting the narrowband frequency region.

3. The terminal of claim 1, wherein the at least one processor is further configured to select a subcarrier close to a center frequency of the narrowband frequency region among subcarriers, except for subcarriers to which a reference signal is mapped in the narrowband frequency region, as the narrowband subcarrier.

4. The terminal of claim 1, wherein the at least one processor is further configured to select one of subcarriers, except for subcarriers to which a cell-specific reference signal (CRS) is mapped, as the narrowband DC subcarrier based on cell identity (cell ID).

5. The terminal of claim 1, wherein the at least one processor is further configured to select one of subcarriers, except for subcarriers to which a demodulation reference signal (DMRS) is mapped, as the narrowband DC subcarrier.

6. The terminal of claim 1, wherein the at least one processor is further configured to select, when the terminal is allocated part of the narrowband frequency region, the narrowband DC subcarrier in the remaining part of the narrow frequency band.

7. The terminal of claim 1, wherein the narrowband DC subcarrier carries at least one of a reference signal and a data signal destined for the terminal.

8. The terminal of claim 1, wherein the at least one processor is further configured to down-convert the received signal to a baseband signal based on the configured narrowband DC subcarrier.

9. The terminal of claim 1, wherein an arbitrary modulation symbol or a predetermined modulation symbol is used for the symbols generated at the terminal.

10. The terminal of claim 1, wherein the at least one processor is further configured to remap to correct a fast Fourier transform (FFT) output index of the received signal based on the narrowband DC subcarrier.

11. A downlink signal reception method of a narrowband communication terminal, the method comprising:
   configuring one of subcarriers forming a narrowband frequency region allocated to the terminal as a narrowband direct current (DC) subcarrier;

receiving a signal from a base station in the narrowband frequency region; and decoding the received signal based on symbols received on subcarriers excluding the narrowband DC subcarrier in the narrowband frequency region and symbols generated at the terminal instead of symbols received on the configured narrowband DC subcarrier.

12. The method of claim 11, wherein the narrowband DC subcarrier is one of the subcarriers forming of one of resource blocks constituting the narrowband frequency region.

13. The method of claim 11, wherein configuring one of the subcarriers as the narrowband DC subcarrier comprises selecting a subcarrier close to a center frequency of the narrowband frequency region among subcarriers, except for subcarriers to which a reference signal is mapped in the narrowband frequency region, as the narrowband subcarrier.

14. The method of claim 11, wherein configuring one of the subcarriers as the narrowband DC subcarrier comprises selecting one of subcarriers, except for subcarriers to which a cell-specific reference signal (CRS) is mapped, as the narrowband DC subcarrier based on cell identity (cell ID).

15. The method of claim 11, wherein configuring one of the subcarriers as the narrowband DC subcarrier comprises selecting one of subcarriers, except for subcarriers to which a demodulation reference signal (DMRS) is mapped, as the narrowband DC subcarrier.

* * * * *